S. P. JOHNSON.
WHEEL.
APPLICATION FILED MAY 27, 1911.

1,004,655.

Patented Oct. 3, 1911.
2 SHEETS—SHEET 1.

Witnesses.
H. L. Opsahl.
A. H. Opsahl.

Inventor:
Simon P. Johnson.
By his Attorneys,
Williamson & Merchant

S. P. JOHNSON.
WHEEL.
APPLICATION FILED MAY 27, 1911.
1,004,655.
Patented Oct. 3, 1911.
2 SHEETS—SHEET 2.
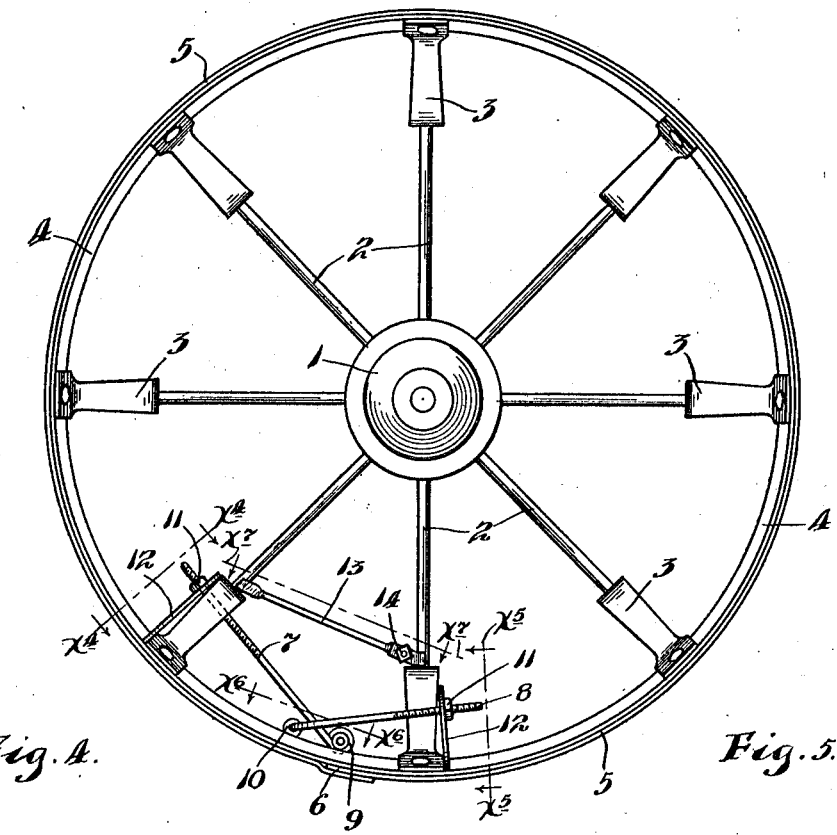
Fig. 3.
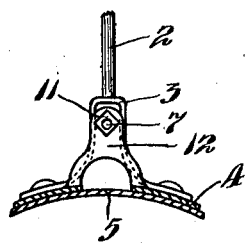
Fig. 4.
Fig. 7.
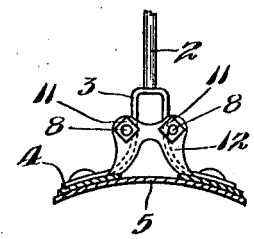
Fig. 5.
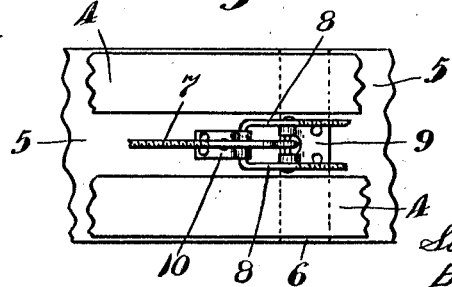
Fig. 6.
Witnesses.
H. L. Opsahl.
A. H. Opsahl.
Inventor.
Simon P. Johnson
By his Attorneys.
Williamson Merchant
COLUMBIA PLANOGRAPH CO., WASHINGTON, D. C.

UNITED STATES PATENT OFFICE.

SIMON P. JOHNSON, OF WESTPOINT, NEBRASKA.

WHEEL.

1,004,655.   Specification of Letters Patent.   Patented Oct. 3, 1911.

Application filed May 27, 1911. Serial No. 629,846.

*To all whom it may concern:*

Be it known that I, SIMON P. JOHNSON, a citizen of the United States, residing at Westpoint, in the county of Cuming and State of Nebraska, have invented certain new and useful Improvements in Wheels; and I do hereby declare the following to be a full, clear, and exact description of the invention, such as will enable others skilled in the art to which it appertains to make and use the same.

My invention has for its object to provide an improved wheel especially adapted for use on corn planters.

In some conditions of the soil, I have found it desirable to have a wheel with a rim that has an open intermediate annular space, and in other conditions of the soil, I have found it desirable to have this space closed. To provide for these conditions in a single wheel, I have constructed the wheel rim proper from a pair of laterally spaced annular members for use in one condition of the soil, and for another condition of the soil, I have provided a supplemental wheel rim which is detachably seated on the wheel rim proper, and completely closes the opening left between the two annular members of the wheel rim proper.

To the above ends, the invention consists of the novel devices and combinations of devices hereinafter described and defined in the claims.

In the accompanying drawings which illustrate the invention, like characters indicate like parts through the several views.

Figure 1:
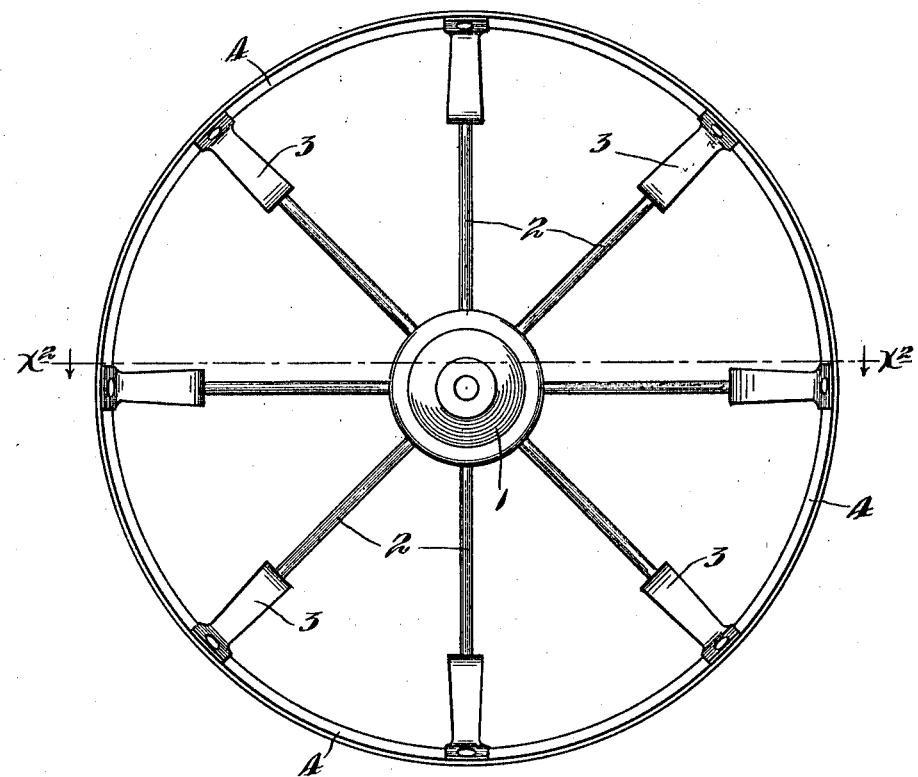
Figure 2:
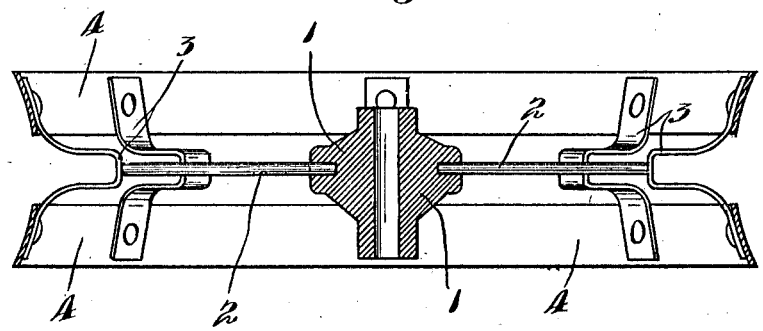

Referring to the drawings,—Figure 1 is a view in side elevation of the improved wheel in one of its forms; Fig. 2 is a view in transverse vertical section taken on the line $x^2$—$x^2$ of Fig. 1; Fig. 3 is a view in side elevation of the improved wheel in its other form, in which view the supplemental wheel rim is secured to the wheel rim proper; Fig. 4 is a transverse section taken on the line $x^4$—$x^4$ of Fig. 3, with some parts in the vicinity thereof being shown in full; Fig. 5 is a transverse section taken on the line $x^5$—$x^5$ of Fig. 3 with some parts in the vicinity thereof being shown in full; Fig. 6 is a detail view of a portion of the anchoring device for the supplemental wheel rim, with some parts sectioned on the line $x^6$—$x^6$ of Fig. 3; and, Fig. 7 is a plan view of the strut connecting certain spokes which are used as anchors for the anchoring device, said spokes being sectioned on the line $x^7$—$x^7$ of Fig. 3.

The numeral 1 indicates the wheel hub and the numeral 2 indicates the spokes. To the outer end of each spoke 2 is secured a metallic bracket in the form of a pair of outwardly and oppositely projecting arms 3. The rim of the wheel is, as shown, concave in cross section and is made up of a pair of laterally spaced annular metallic members 4, and which members are secured to the free ends of the arms 3, as best shown in Fig. 2, by means of rivets or otherwise.

Detachably seated on the outer faces of the two members of the wheel rim 4, is a supplemental wheel rim 5, preferably constructed of spring metal and also formed concave in cross section, and closely fits around the wheel rim 4. As shown in Figs. 4, 5, and 6, the supplemental rim 5 is somewhat wider than the wheel rim 4 and completely closes the opening between its two members. The supplemental wheel rim 5 is transversely severed and its severed ends are indicated by the numeral 6, and are overlapped as best shown in Fig. 3.

Reversely projecting and crossed draw bolts 7 and 8 are provided for clamping the supplemental wheel rim 5 onto the wheel rim 4. These draw bolts 7 and 8 are pivotally secured to a pair of hinge lugs 9 and 10, respectively, and which hinge lugs, in turn, are rigidly secured to the inner face of the supplemental wheel rim 5, one in the vicinity of each of the severed ends 6 of the supplemental wheel rim 5, and project between the two members of the wheel rim 4. The free end of the draw bolt 7 projects between the arms 3 of the first spoke 2 on the opposite side of the severed portion of the supplemental wheel rim 5 to which the draw bolt 7 is secured. The draw bolt 8 is U-shape in form, with its intermediate portion pivotally connected to the hinge lug 10 and its end portions embrace the draw bolt 7 and the arm 3 of the first spoke on the opposite side of the severed portion of the supplemental rim 5 to which the draw bolt 8 is secured. Adjusting nuts 11 have screw threaded engagement with the free ends of the draw bolts 7 and 8, and washers 12 are interposed between the lugs 11 and the adjacent arms 3. Each washer 12 is provided with a pair of depending legs which rest upon the two members of the wheel rim 4 and support said washers in their proper positions. As is evident, the arms 3 to which the draw bolts 7 and 8 are anchored, act as bases of resistance for said draw bolts.

To hold the spokes 2 and their arms 3, which are used as anchoring devices for the draw bolts 7 and 8, in their proper places, a strut 13 embraces the said spokes. This is accomplished by bifurcating each end of the strut. One prong of one of the bifurcated ends of the strut 13 is made removable and is secured in position by means of a nutted bolt 14, thereby permitting the strut 13 to be applied to or removed from working position. By making the two wheel rims 4 and 5 concave in cross section, the same are securely held, with respect to each other, against lateral movement.

The above device, while extremely simple and easy to operate, is thought to be highly efficient for the purpose had in view.

What I claim is:

1. In a wheel, the combination with a hub, a wheel rim comprising a pair of laterally spaced annular members, and spokes connecting the members of said rim with each other and with said hub, of a supplemental wheel rim that is transversely severed and detachably seated on the members of the first noted wheel rim and spanning the opening therebetween, means for anchoring one of the severed ends of said supplemental wheel rim, and an anchored draw bolt secured to said supplemental wheel rim in the vicinity of its other severed end, for drawing said supplemental wheel rim on the first noted wheel rim, substantially as described.

2. In a wheel, the combination with a hub, a wheel rim comprising a pair of laterally spaced annular members, and spokes connecting the members of said rim with each other and with said hub, of a supplemental wheel rim that is transversely severed and detachably seated on the members of the first noted wheel rim and spanning the opening therebetween, and reversely extended draw bolts secured to said supplemental rim, one in the vicinity of each of its severed ends, and anchored to certain of said spokes on either side of the severed ends of said supplemental rim as a basis of resistance, substantially as described.

3. In a wheel, the combination with a hub, a wheel rim comprising a pair of laterally spaced annular members, and spokes connecting the members of said rim with each other and with said hub, of a supplemental wheel rim that is transversely severed and detachably seated on the members of the first noted wheel rim and spanning the opening therebetween, reversely extended draw bolts secured to said supplemental rim, one in the vicinity of each of its severed ends, and anchored to certain of said spokes on either side of the severed ends of said supplemental rim, as a basis of resistance, and a strut connecting the spokes to which said draw bolts are anchored, substantially as described.

In testimony whereof I affix my signature in presence of two witnesses.

SIMON P. JOHNSON.

Witnesses:
C. W. ACKERMAN,
LAWRENCE W. JOHNSON.

---

Copies of this patent may be obtained for five cents each, by addressing the "Commissioner of Patents, Washington, D. C."